United States Patent
Pozzi

(10) Patent No.: US 11,365,031 B2
(45) Date of Patent: Jun. 21, 2022

(54) DEVICE FOR PACKAGING AND DISPENSING A PRODUCT, HAVING A DOSING MOUTHPIECE WITH AN EXTERNALLY CLEAN END

(71) Applicants: Horus Pharma, Saint-Laurent-du-Var (FR); Santen SA, Geneva (CH)

(72) Inventor: Jacques Pozzi, Antibes (FR)

(73) Assignees: Horus Pharma; Santen SA

( * ) Notice: Subject to any disclaimer, the term of this patent is extended or adjusted under 35 U.S.C. 154(b) by 0 days.

(21) Appl. No.: 17/053,508

(22) PCT Filed: May 7, 2019

(86) PCT No.: PCT/EP2019/061680
§ 371 (c)(1),
(2) Date: Nov. 6, 2020

(87) PCT Pub. No.: WO2019/215150
PCT Pub. Date: Nov. 14, 2019

(65) Prior Publication Data
US 2021/0221575 A1 Jul. 22, 2021

(30) Foreign Application Priority Data
May 7, 2018 (FR) ..................... 1800463

(51) Int. Cl.
*B65D 47/18* (2006.01)
*B65D 47/40* (2006.01)
*G01F 11/08* (2006.01)

(52) U.S. Cl.
CPC ............. *B65D 47/18* (2013.01); *B65D 47/40* (2013.01); *G01F 11/08* (2013.01)

(58) Field of Classification Search
CPC ......... B65D 47/18; B65D 47/40; G01F 11/08; B05C 11/1034; A61F 9/0008; B05B 11/3032
See application file for complete search history.

(56) References Cited

U.S. PATENT DOCUMENTS 2,188,802 A * 1/1940 Lloyd .................... B65D 47/18
222/420
7,303,098 B2 * 12/2007 Backes .................. B65D 47/18
222/212

(Continued)

FOREIGN PATENT DOCUMENTS

| FR | 0900433 A | 6/1945 |
| FR | 2941682 A1 | 8/2010 |

OTHER PUBLICATIONS

French Search Report for Application No. FR1800463, dated Jan. 25, 2019, pp. 1-2.

(Continued)

*Primary Examiner* — Vishal Pancholi
*Assistant Examiner* — Bob Zadeh
(74) *Attorney, Agent, or Firm* — Lerner, David, Littenberg, Krumholz & Mentlik, LLP

(57) ABSTRACT

The device for packaging and dispensing a product comprises a container (1) intended to contain in a sterile manner the product to be packaged and dispensed in the form of calibrated doses or drops by means of a dispensing accessory equipped with a mouthpiece (4) of the type having a flexible part (5), said accessory forming a dosing chamber (7) for the dispensing of the calibrated drop. An outer wall (8) of the mouthpiece delimits a space (18) equipped with one or more openings (19), the end of said mouthpiece (4) including a central channel (13) allowing the dispensing of the calibrated drop, associated with one or more lateral channels (11) leading into the space (18). A cover (14)

(Continued)

equipped with an inner skirt (15), in the mounted state, creates an overpressure so as to eliminate any residual drop (10) which can subsist in the mouthpiece (4) at the end. Application to the dispensing of doses of sterile products, particularly of drops in ophthalmology.

17 Claims, 3 Drawing Sheets

(56) References Cited

U.S. PATENT DOCUMENTS

| | | | |
|---|---|---|---|
| 7,971,755 B2 * | 7/2011 | Faurie | B65D 47/18 222/189.09 |
| 2006/0043116 A1 * | 3/2006 | Kawashiro | B65D 47/2068 222/212 |
| 2008/0302828 A1 * | 12/2008 | Pozzi | B65D 47/2056 222/189.09 |
| 2011/0278323 A1 * | 11/2011 | Pozzi | B65D 47/18 222/108 |
| 2011/0297703 A1 * | 12/2011 | Wilson | B65D 47/18 222/212 |
| 2014/0197207 A1 * | 7/2014 | Pozzi | B05B 11/00444 222/189.09 |
| 2015/0112286 A1 * | 4/2015 | Claret | B29D 22/00 604/296 |
| 2021/0221575 A1 * | 7/2021 | Pozzi | B65D 47/18 |

OTHER PUBLICATIONS

International Search Report for Application No. PCT/EP2019/061680, dated Jul. 5, 2019, pp. 1-2.

* cited by examiner

FIG. 1
FIG. 2
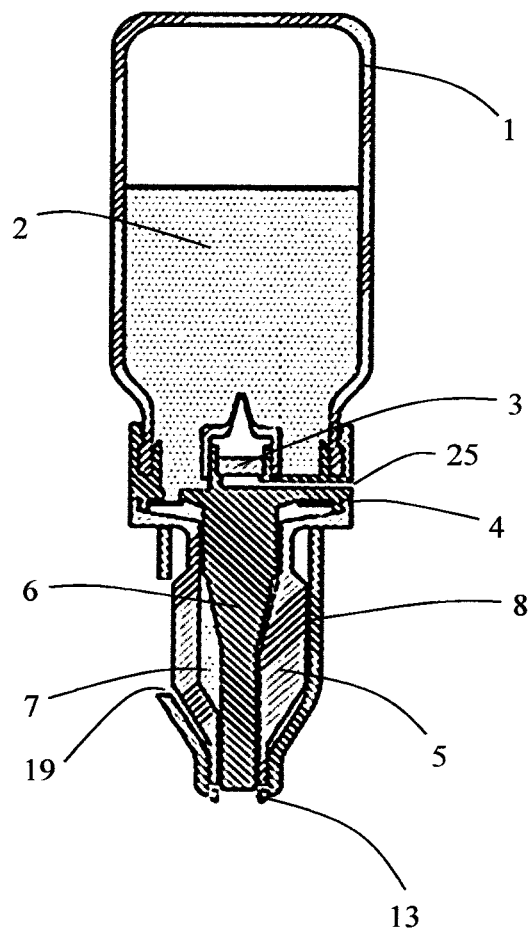
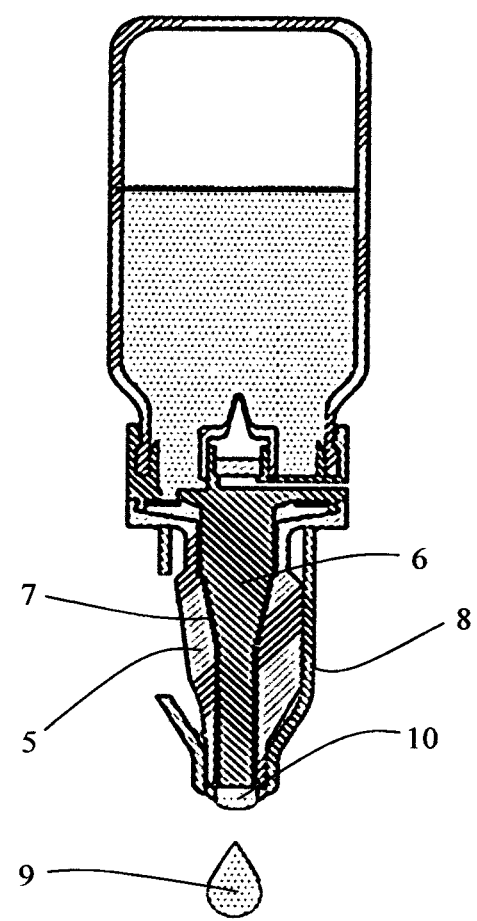

FIG. 3
FIG. 4
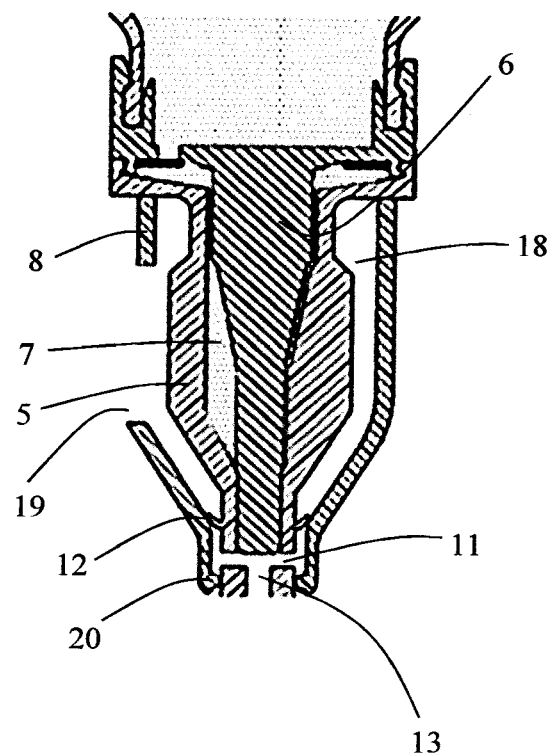
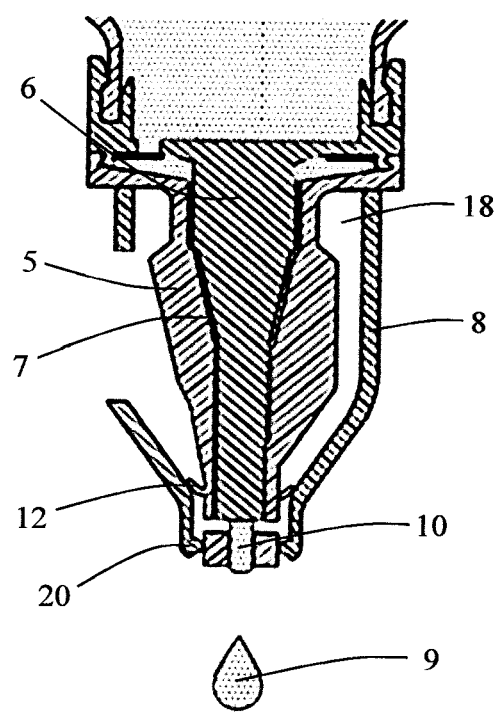
FIG. 5
FIG. 6
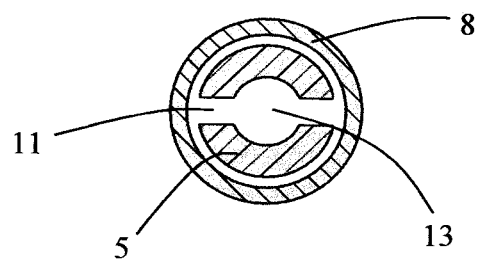
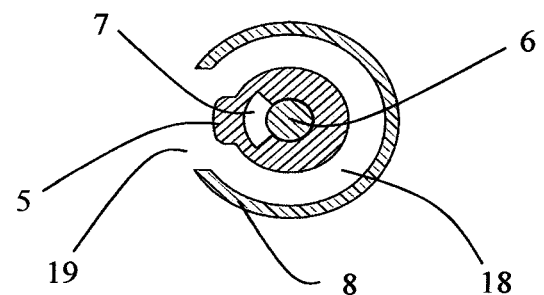

DEVICE FOR PACKAGING AND DISPENSING A PRODUCT, HAVING A DOSING MOUTHPIECE WITH AN EXTERNALLY CLEAN END

CROSS-REFERENCE TO RELATED APPLICATIONS

The present application is a national phase entry under 35 U.S.C. § 371 of International Application No. PCT/EP2019/061680 filed May 7, 2019, which claims priority from French Application No. 1800463 filed May 7, 2018, all of which are hereby incorporated herein by reference.

The present invention relates to the technical field of packaging, and more specially to that of packaging and dispensing of a liquid product, semi-fluid or in suspension, intended to be preserved in a sealed and sterile manner without the addition of a preservative, and to be dispensed in the form of accurate unit doses by means of a dispensing assembly.

More particularly, the invention has as its object a device for packaging and dispensing a product, which comprises a container intended to contain the product to be dispensed by means of an outlet accessory with which the container is equipped, said accessory comprising a mouthpiece.

Devices for packaging of conventional structure are known which allow preserving and dispensing a product in the form of calibrated doses or drops or in any other form, while maintaining its cleanliness or its sterility for the entire duration of its use.

These devices are used in particular in the pharmaceutical, cosmetic and food fields, and for some more particularly in the ophthalmological field.

Thus such devices are known in which the product is expelled through a flexible mouthpiece, forming an accessory with which the container is equipped, and which opens under the influence of the pressure created by a pressure on the walls of the container containing the product, or on the mouthpiece itself, and which closes again under the influence of its elasticity. In this device, a bacteriological filter associated with a check valve is located in the bottom of the container which is equipped with an orifice allowing air changing.

All of these devices, which include a bacteriological filter associated with a check valve allowing the sterile filtration of refilling air, allow the sterile preservation of the product inside the container for the duration of its use and can be considered effective from this point of view.

These devices have, on the other hand, the major disadvantage of not ensuring the perfect bacteriological cleanliness outside the container, and more particularly at the end of the mouthpiece.

In fact, when a calibrated drop of product has been expelled by one of the means included in these devices, in conformity with their purpose, a fraction of this calibrated drop, which will be hereinafter called a residual drop, subsists at the end of the mouthpiece.

Experience has shown that, regardless of the device and the means implemented to expel a calibrated drop of product, it is not possible to avoid the formation of a residual drop which will subsist at the end of the mouthpiece until the next use of the device.

The formation and then the presence of this residual drop constitutes a major disadvantage because, unlike the product which is located inside the container and which can be kept clean and sterile, this residual drop remains in contact with the outside air which is likely to contaminate it.

The goal sought by these existing devices, which is to keep clean or sterile, without the aid of preservatives, the product that they enclose and dispense, is not attained because, even if the product is in fact kept clean or sterile inside the container, it can be contaminated at the end of the dispensing mouthpiece.

One solution for resolving this problem is described in patent FR 0900433, which consists either of re-aspirating the residual drop into a cavity in which it will dry, or expelling it from the end of the mouthpiece by blowing it.

It must be noted, however, that no device of this type, aiming to eliminate the residual drop either by re-aspiration or by blowing has been produced up to now and that the concretization of the teachings of this patent has proven to be very difficult.

In fact, the proposed technology consists of using the same pressure on the dispensing accessory to obtain simultaneously or successively the dispensing of a calibrated drop and the elimination of the residual drop.

The present invention aims at allowing the use of devices enabling the dispensing of calibrated drops of clean or sterile product, without having the disadvantage of a risk of bacterial contamination outside said device.

To this end, the invention proposes a device for packaging and dispensing a product, generally a liquid, semi-fluid or suspended product, comprising a container intended to contain the product, and a dispensing accessory equipped with a mouthpiece and actuatable to dispense said product in the form of doses or determined drops, preferably in the form of clean or sterile calibrated drops, the device comprising:

a dosing chamber for storing a predetermined amount of the product, and
  one end belonging to the mouthpiece, where a central channel is formed to communicate with the dosing chamber in an actuated state of the dispensing accessory, allowing to expel the dose or the determined drop,
  the mouthpiece further including one or more lateral channels opening into the central channel and able to circulate air transversely into the central channel and/or allow a blowing of a residual drop present at said end after expulsion of the dose or the determined drop.

Thus the device allows dispensing calibrated doses or drops of clean or sterile product, typically by simple pressure on the accessory or on the mouthpiece with which the accessory is equipped, while having the assurance that no residual drop, likely to be contaminated, will subsist at the end of the mouthpiece after the expulsion of a calibrated drop or dose.

With such an arrangement of the mouthpiece, allowing the central channel to communicate with one or more lateral channels (channels offset from the expulsion direction of the calibrated drop, i.e. channels extending at an angle relative to the central channel), the removal of the residual product which may remain on the end of the mouthpiece is in fact achieved. The device will be able to remain clean at this front end where the central channel leads. It is understood that the residual drop possibly being present at the end of said accessory can be blown toward a peripheral space via the lateral channel(s), typically by the effect of overpressure created by the laying of a cover. With certain geometries, at the end of the mouthpiece, the device can even deliver said calibrated dose or drop without allowing the formation of a residual drop in the junction area with the lateral channels, due to the circulation of air allowed in this area (streamlines of air circulation which are created by the lateral channel(s), during the expulsion of the calibrated drop, coincide with the surface where the product could be deposited).

As mentioned above, the lateral channels are channels offset from the expulsion direction of the calibrated drop, i.e. channels extending at an angle relative to the central channel. The lateral channels may for instance be oriented perpendicular with respect to the expulsion direction of the calibrated drop which is substantially parallel to the longitudinal direction of the central channel. The lateral channels can also be oriented at a different angle, preferably in a direction toward the base of the mouthpiece, i.e. toward the container.

The lateral channels can for example be angled with an angle relative to the central channel which is lower than 90° but greater than 10°, for example an angle comprised between 10° and 50°, preferably between 20° and 30°.

Preferably, a lateral channel has a diameter which is at least 25% of the diameter of the central channel, and preferably at most 70% of the diameter of the central channel.

For instance, the diameter of the lateral channel can be between 30% and 60% of the diameter of the central channel.

Optionally, a filtration assembly is provided.

According to one feature, the mouthpiece has a rigid part cooperating with a flexible part, the assembly of these parts forming the dosing chamber for the dispensing of the determined and calibrated drop or dose.

According to one feature, an additional piece surrounds the flexible part and forms with the latter a collection space equipped with several openings.

Optionally, an air intake orifice is provided for, forming a pressure balancing orifice. The device can also have a filtration assembly able to filter air entering the container while being conveyed via the pressure balancing orifice.

By way of an example, the device which allows storing a product and dispensing it in the form of calibrated sterile drops or doses includes a container equipped with an orifice for the intake of refilling air and an associated filter with a check valve (i.e. a non-return valve) allowing said air to be sterilized when it reaches inside said container. The product is stored inside said container and dispensed by means of a flexible (at least in part) mouthpiece forming an accessory with which said container is equipped. This mouthpiece includes the dosing chamber allowing the determination of the volume of the calibrated drop or dose and which, when it is compressed, allows said drop or dose to be expelled outside said container by means of the opening of another check valve preventing the penetration of air from the outside toward the dosing chamber.

The filter can be mounted in the container or in the accessory. The pressure balancing orifice can open laterally while the dispensing end forms an axial protrusion centered around a central axis of the device.

Advantageously, an additional piece or a supplementary part can be placed outside the flexible part of the dispensing mouthpiece for the purpose of obtaining a space between itself and said flexible part.

Another check valve, located between the dosing chamber and the inside of the container, prevents any product return from the inside of the dosing chamber to the inside of the container when the dosing chamber is compressed, and allows the filling of said dosing chamber by aspiration of the product contained in the container when said dosing chamber is released.

Advantageously, and in a first embodiment of the present invention, the end of the mouthpiece is equipped with a longitudinal central channel allowing the dispensing of the product when the dosing chamber is compressed, and two additional lateral channels provided at the base of said central channel, which serve to convey the residual drop to a cavity determined by the residual space between the outside of the flexible part and the supplementary part. In this embodiment, the end of the additional piece cooperates sealingly with the inner skirt of a protection cover. Thus, when the protection cover is placed, a space isolated from the outside is created around the longitudinal central channel located at the end of the mouthpiece and in which the residual drop is formed. The volume of this isolated space decreases as the cover is depressed, thus creating an overpressure which drives the residual drop out of said central channel then through the lateral channels and finally into the space existing between the outside of the flexible mouthpiece and the additional piece.

This enables creating, in a simple manner, a device which allows blowing the residual drop of product to the outside of the end of the dispensing mouthpiece toward an unconfined space in which it will dry.

In another embodiment, another check valve is placed between the outside of the end of the flexible mouthpiece and the inside of the additional piece so as to prevent the passage of product in the lateral channels when a calibrated drop is dispensed, to allow the residual drop to be propelled toward the cavity determined by the residual space between the outside of the dispensing mouthpiece and the additional piece when a cover is put in place, and to prevent the return of this residual drop toward the lateral channels when the device is ready to deliver a new dose of product.

In embodiments of the invention one or more of the following features can be provided solely or in combination with one another:
- the mouthpiece is provided with a collection space for collecting the residual drop, delimited between an outer wall of the mouthpiece and a tubular wall of the mouthpiece, the collection space being able to collect the product of said residual drop via the lateral channel(s).
- the mouthpiece is equipped with a flexible part which externally delimits the dosing chamber.
- an outer wall of the mouthpiece is formed at least in part by a piece separate from the flexible part.
- the mouthpiece is provided with a collection space for collecting the residual drop, delimited between the outer wall and a tubular wall of the mouthpiece included at least partially in the flexible part
- the collection space is an inner space able to collect the residual drop via the lateral channel(s).
- the device comprises a cover adapted to pressurize air on the side of an external outlet of the central channel when laying the cover on the dispensing accessory.
- the mouthpiece has an outer side face which extends to said end of the mouthpiece, the cover being equipped with an inner skirt cooperating with this outer side face and/or able to axially bear on the end, whereby it is allowed to create an overpressure in a volume adjacent to the central channel and internal to the cover when the cover is in a depressed state on the dispensing accessory.
- the piece separate from the flexible part has, at the end of the mouthpiece, one or more barrier element (s) (cusps for example) cooperating with one end of said tubular wall formed by the flexible part, so as to prevent part of the product to escape between the flexible part and said piece, when the dose or the determined/calibrated drop is expelled.

the flexible part of the mouthpiece is equipped with valve means, optionally in the form of one or more outer elastic lip(s), cooperating with an inner face of said piece, (selectively) allowing the residual drop to enter the collection space which extends internally between the flexible part and the piece when the volume (adjacent to the central channel) is compressed by bringing the cover closer to the dispensing accessory and depressing it toward the latter; it is understood that this arrangement with outside lip(s) can prevent the product in the dosing chamber from passing into the collection space (prevent the product derived from the calibrated drop from passing the collection space) when the dose or calibrated drop is dispensed, and preventing the product in the collection space from passing into the lateral channel(s) (preventing the product derived from the residual drop from passing from the space into the lateral channel(s)) when a new dose or calibrated drop is dispensed.

the valve means is of the type with an elastic return effect.

the valve means typically has a default conformation in which an annular contact is accomplished between the outer wall (typically accomplished in the form of a separate piece) and the flexible part of the mouthpiece that can be actuated, these valve means being movable by deformation only in the event of overpressure on the side of the lateral channel(s) (the surface of the seat on which these valve means bear prevents movement of the valve means in the other direction, in the event of a depression on the side of the lateral channel(s)).

the valve means is integrally formed with or applied fixedly to one of said piece and the flexible part.

said piece is equipped with one or more openings allowing communication between the collection space and the outside of the device (thus, drying of the residue is allowed).

the mouthpiece has a rigid part cooperating with a flexible part, a rod (typically rectilinear, axial) of the rigid part being surrounded by the flexible part which can be actuated, at an actuating portion, by pressure exerted radially inwards toward said rod.

the mouth piece has a rigid part surrounded by a flexible part which can be actuated by a pressure exerted radially inwards toward said rigid part.

the device comprises a pressure balancing orifice, and a filter assembly able to filter air entering the container via the pressure balancing orifice.

Other features and advantages of the invention will be revealed from the description given below, with reference to the appended drawings which show, by way of non-limiting examples, embodiments and implementations of the object of the invention. In these drawings:

FIG. 1 is a schematic view in axial section of a device conforming to the invention when it is not under load, showing the container containing the product to be dispensed, assembly for refilling the air (through a sterile filter and a check valve), the mouthpiece of the dispensing accessory including here a flexible part cooperating with a rigid part, forming a dosing chamber and including a supplementary part partially surrounding said flexible part;

FIG. 2 is an axial section view of the device shown in FIG. 1 after loading and expulsion of a calibrated drop and formation of a residual drop;

FIG. 3 is an axial section view of the device conforming to the invention, showing the dispensing mouthpiece whose end is equipped with a central channel, with lateral channels and with a check valve located between the end of the flexible mouthpiece and the additional piece, when it is not under load;

FIG. 4 shows the dispensing mouthpiece as described in FIG. 3 when the flexible part is under load, thus allowing the dispensing of a drop of product and the formation of a residual drop located inside the central channel of the end of the flexible part;

FIG. 5 shows a transverse section of the end of the dispensing mouthpiece showing the central channel as well as the lateral channels;

FIG. 6 shows a transverse section of the dispensing mouthpiece at the dosing chamber;

In the different figures, the same numerical labels designate similar elements of the different embodiments shown and described. Certain dimensions of thicknesses can be exaggerated on the drawings, for the purpose of clarity/comprehension.

Figure 7:
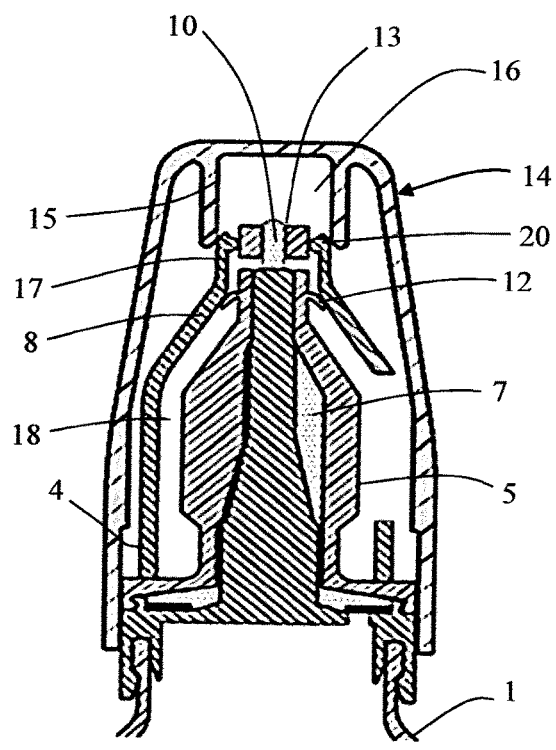
FIG. 7 shows the device that is the object of the invention when the flexible part is no longer under load, when the residual drop is present in the central channel of the end of the dispensing mouthpiece, and when a protection cover is present and just before being placed on the mouthpiece.

As shown in FIG. 1 the device, which is not under load, comprises a container 1 containing the product to be dispensed 2, a filter assembly 3 (optional), a dispensing assembly or accessory including a mouthpiece 4 composed of a rigid part 6 and a flexible part 5, such assembly forming a dosing chamber 7.

The filter assembly 3 comprises a filter element, mounted for example in the dispensing accessory as illustrated on FIG. 1, and allows air to pass into the container 1 via a pressure balancing orifice 25.

It is understood that the dispensing assembly can include an element forming an outer wall separate from the flexible part 5, in order that this outer wall is arranged at the periphery of a tubular wall of the flexible part 5 which serves to delimit the dosing chamber 7. Optionally, an additional piece 8 is provided, partially surrounding the dispensing assembly 4 so as to form the outer wall.

The pressure balancing orifice 25 can lead, laterally for example, into an intermediate area of the device, between the outer wall of the mouthpiece 4 and the one-piece body (typically rigid in the illustrated example) forming the container 1.

As is clearly visible in FIGS. 1 and 3 in particular, the additional piece 8 forming said outer wall of the mouthpiece 4 is for example equipped with an opening 19 allowing pressure on the flexible part 5 so as to cause the compression of the dosing chamber 7 and allow the dispensing of a dose of the product, and its return to the initial position when the loading ceases. This opening 19 could be partially closed with an actuating part that enables the user to push and apply a pressure on the flexible part 5.

This opening 19 and/or another opening in the outer wall of the mouthpiece 4 also allows the connection to the atmosphere of the inside of the space 18 delimited between the outside of the flexible part 5 and the inside of the additional piece 8.

FIG. 2 shows the same device when the flexible part 5 is under load, the dosing chamber 7 being compressed, a dose of the product 9 having been expelled and a residual drip 10 having formed at the end of the mouthpiece 4.

FIG. 3 shows the detail of the end of the dispensing assembly when it is not under load. A longitudinal central channel 13 can be seen (delimited by a portion of the annular wall extending from the tubular wall of the flexible part 5) provided at the end of the flexible part 5 for the passage of product when a dose is dispensed, and one or more lateral channels 11 located at the base of the central channel 13. A collection space 18 is delimited between the flexible part 5 and the additional piece 8 which is equipped with one or more openings 19 allowing bearing on the flexible part 5 and allowing the inside of the collection space 18 to communicate with the outside. The end of the flexible part 5 includes a check valve 12 (i.e. a non-return valve allowing a fluid flow along one direction only) which provides a seal when it is at rest, with the inside of the part 8. The end of the part 8 includes a circular cusp 20 or similar barrier effect element which forms a seal with the end of the flexible part 5.

FIG. 4 shows a device as described in FIG. 2 when it has been placed under load by bearing on the flexible part 5, the dosing chamber 7 has been compressed, a calibrated drop of product 9 has been dispensed and a residual drop 10 has been formed and subsists in the longitudinal central channel 13.

Tate's Law teaches that the fall of a calibrated drop depends on its mass and the diameter of the orifice at the end of which it is formed, and that it arises from the rupture of a liquid stream (i.e. the separation of the liquid stream) which creates said calibrated liquid drop as well as a residual drop.

The existence of lateral channels 11 provided here at the base of the central channel 13 can allow, under certain viscosity and surface tension conditions of the product to be dispensed, as well as for appropriate relative dimensions of the lateral channels 11 and of the central channel 13, to prevent Tate's Law to apply and to dispense a calibrated drop 9 without the formation of a residual drop. This absence of deposit on the end of the mouthpiece results from stream lines and/or depression conditions (for the air near the central channel 13) that are unfavorable to the deposition of a product residue in the axial area.

As shown in FIG. 4, a residual drop 10 is formed and subsists in the channel 13. The product dose 9 can be dispensed through the central channel 13. The cusp 20 is provided to prevent the passage of product between the end of the flexible part 5 and the additional piece 8. The check valve 12 is provided to prevent the passage of product toward the space 18. The pressure caused by the departure of the dose 9 of product is not sufficient to overcome the elastic resistance of said valve 12.

FIG. 7 shows the dispensing assembly when it is no longer under load. The product enters the dosing chamber 7 for the subsequent dispensing of a new dose of product, the residual drop 10 subsists in the central channel 13 and a protection cover 14 is presented on the dispensing mouthpiece 4.

The cover 14 is equipped with an inner skirt 15, the geometry of which allows it to slide sealingly around the end 17 of the additional piece 8, and determines a closed space 16.

Figure 8:
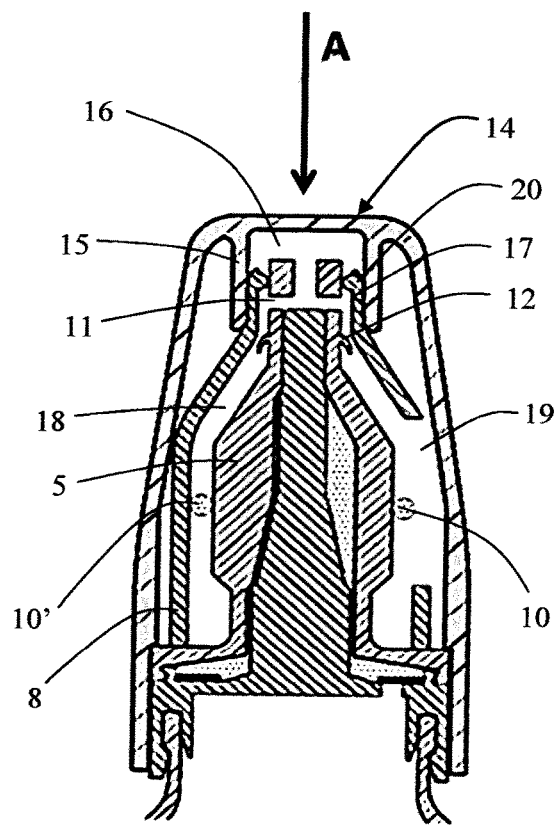
FIG. 8 is a view similar to FIG. 7 when the protection cover is placed after having been pushed towards the mouthpiece, the residual drop has been driven from the inside of the central channel toward the collection space located between the flexible part and the additional piece, and the check valve is in the open position so as to allow the passage of said residual drop.

When the protection cover 14 is depressed on the dispensing mouthpiece as shown by arrow A in FIG. 8, the skirt 15 cooperates with the end 17 of the additional piece 8 to create an overpressure in the space 16. Under the influence of this overpressure, the residual drop 10 is driven toward the inside of the collection space 18, after having opened the valve 12, the elasticity of which is not sufficient to withstand said overpressure.

The residual drop 10, 10' is then located in the collection space 18, the opening(s) 19 of which allow(s) passage of outside air which will allow the residual drop 10, 10' to dry. The drying of said residual drop 10, 10' will have the effect of preventing the development of bacteria.

In the event that the device is used before complete drying of the residual drop 10 has occurred, the check valve 12 will prevent its return toward the lateral channels 11 and the central channel 13 and its possible entrainment of a calibrated dose of product during a subsequent dispensing.

A simple device is thus produced, not necessitating an additional operation by the user, and making it possible to not contaminate the successive does of product either by not allowing the formation of a residual drop or by not allowing this residual drop, if it is formed, to contaminate the sterile doses that will be dispensed subsequently.

Other embodiments are possible without departing from the scope of the invention. Thus such a device can be produced including dosing chambers in different numbers and with different shapes.

The invention claimed is:

1. A device for packaging and dispensing a product, comprising:
    a container intended to contain the product;
    a dispensing accessory equipped with a mouthpiece and actuatable to dispense said product in the form of doses or determined drops;
    a dosing chamber for storing a predetermined amount of the product; and
    one end belonging to the mouthpiece, where a central channel is formed to communicate with the dosing chamber in an actuated state of the dispensing accessory, allowing to expel the dose or the determined drop,
    wherein the mouthpiece further includes one or more lateral channel(s) which is open into the central channel irrespective of whether or not the dispensing accessory is in the actuated state to expel the dose or the determined drop,
    the lateral channel(s) configured to circulate air transversely into the central channel and/or allow a blowing of a residual drop present at said end after expulsion of the dose or the determined drop.

2. The device according to claim 1, wherein the mouthpiece is provided with a collection space for collecting the residual drop, delimited between an outer wall of the mouthpiece and a tubular wall of the mouthpiece, the collection space being able to collect the product of said residual drop via the lateral channel(s).

3. The device according to claim 1, wherein the mouthpiece is equipped with a flexible part which externally delimits the dosing chamber, an outer wall of the mouthpiece being formed at least partly by a piece separate from the flexible part,
    and wherein the mouthpiece is provided with a collection space for collecting the residual drop, delimited between the outer wall and a tubular wall of the mouthpiece included at least partially in the flexible part, the collection space being an inner space able to collect said residual drop via the lateral channel(s).

4. The device according to claim 3, wherein said piece separate from the flexible part has, at the end of the mouthpiece, one or more barrier element(s) cooperating with one end of said tubular wall formed by the flexible part, so as to prevent part of the product to escape between the flexible part and said piece, when the dose or the determined drop is expelled.

5. The device according to claim 3, wherein said piece is equipped with one or more opening(s) allowing communication between the collection space and outside of the device.

6. The device according to claim 1, comprising a cover adapted to pressurize the air on the side of an external outlet of the central channel when laying the cover on the dispensing accessory.

7. The device according to claim 6, wherein the mouthpiece has an outer side face which extends to said end of the mouthpiece, and wherein the cover is equipped with an inner skirt cooperating with the outer side face and/or able to axially bear on the end, whereby it is allowed to create an overpressure in a volume adjacent to the central channel and internal to the cover when the cover is in a depressed state on the dispensing accessory.

8. The device according to claim 7, wherein the mouthpiece is equipped with a flexible part which externally delimits the dosing chamber, an outer wall of the mouthpiece being formed at least partly by a piece separate from the flexible part, and wherein the mouthpiece is provided with a collection space for collecting the residual drop, delimited between the outer wall and a tubular wall of the mouthpiece included at least partially in the flexible part, the collection space being an inner space able to collect said residual drop via the lateral channel(s)

wherein the flexible part of the mouthpiece is equipped with valve means, cooperating with an inner face of said piece, allowing the residual drop to enter the collection space which extends internally between the flexible part and the piece when the volume is compressed by bringing the cover closer to the dispensing accessory and depressing it toward the latter, but preventing the product in the dosing chamber from passing into the collection space when the dose or calibrated drop is dispensed, and preventing the product in the collection space from passing into the lateral channel(s) when a new dose or calibrated drop is dispensed.

9. The device according to claim 8, wherein the valve means is in the form of one or more outer elastic lip(s).

10. The device according to claim 1, wherein the mouthpiece has a rigid part surrounded by a flexible part which can be actuated by a pressure exerted radially inwards toward said rigid part.

11. The device according to claim 1, wherein the lateral channel(s) extend at an angle relative to the central channel, said angle being between 10° and 90°.

12. The device according to claim 1, wherein the lateral channel(s) extend perpendicularly to the central channel.

13. The device according to claim 1, comprising:
a pressure balancing orifice, and
a filter assembly able to filter the air entering the container via the pressure balancing orifice.

14. The device according to claim 1, wherein the device is configured to package and dispense a liquid, semifluid or suspended product.

15. The device according to claim 1, wherein the dispensing accessory is configured to dispense said product in the form of clean or sterile calibrated drops.

16. The device according to claim 1, wherein the lateral channel(s) extend at an angle relative to the central channel, said angle being between 10° and 50°.

17. The device according to claim 1, wherein the lateral channel(s) extend at an angle relative to the central channel, said angle being between 20° and 30°.

* * * * *